United States Patent [19]

Cross et al.

[11] 4,436,057
[45] Mar. 13, 1984

[54] METHOD AND APPARATUS ENABLING THERMAL ENERGY RECOVERY IN COMBUSTOR OPERATION

[75] Inventors: Henry F. Cross, Rickmansworth; Maurice Harman, Milton Keynes, both of England

[73] Assignee: Energy Equipment Co. Ltd., Bedfordshire, England

[21] Appl. No.: 237,144

[22] PCT Filed: Jun. 6, 1980

[86] PCT No.: PCT/GB80/00101
§ 371 Date: Feb. 10, 1981
§ 102(e) Date: Feb. 10, 1981

[87] PCT Pub. No.: WO80/02868
PCT Pub. Date: Dec. 24, 1980

[30] Foreign Application Priority Data
Jun. 15, 1979 [GB] United Kingdom ............ 7920965

[51] Int. Cl.³ .................... F23G 5/02; F22B 1/02
[52] U.S. Cl. .................... 122/4 D; 110/215; 110/245; 110/346
[58] Field of Search .......... 122/4 D, 20 B; 110/215, 110/245, 234, 251, 254, 345

[56] References Cited

U.S. PATENT DOCUMENTS

| | | | |
|---|---|---|---|
| 1,291,175 | 1/1919 | Sargent et al. | 110/215 |
| 3,572,264 | 3/1971 | Mercer | 110/215 |
| 3,648,666 | 3/1972 | Foldes et al. | 122/4 D |
| 3,716,339 | 2/1973 | Shigaki et al. | 110/215 |
| 3,736,886 | 6/1973 | Menigat | 110/254 |
| 3,924,402 | 12/1975 | Harboe | 122/4 D |
| 3,926,129 | 12/1975 | Wall | 110/245 |
| 3,996,862 | 12/1976 | Besik et al. | 110/215 |
| 4,098,200 | 7/1978 | Dauvergne | 110/215 |
| 4,240,378 | 12/1980 | Caplin | 122/4 D |
| 4,241,672 | 12/1980 | Tuttle | 110/346 |

FOREIGN PATENT DOCUMENTS 2296144 7/1976 France ............ 110/215

Primary Examiner—Henry C. Yuen
Attorney, Agent, or Firm—Murray Schaffer

[57] ABSTRACT

The specification describes a method and arrangements for operating fluidized bed combustors in particular boilers. In the described method and arrangements thermal energy carried away from the combustor by the flue-gas emitted therefrom is recuperated by passing the flue-gas through a scrubber in which it is scrubbed with water. The scrubbing water subsequently being used to pre-heat fluidizing gas fed to the fluidized bed in the combustor and/or working fluid fed to the boiler. Additional description is given of using a heat exchanger through which both flue-gases from the combustor and the working fluid fed to the combustor are fed such that the heat carried away from the combustor in the flue-gases is given directly to the working fluid fed to the combustor. In the described method and arrangements the fluidizing gas may be charged with water vapor and/or steam easing control of the bed.

5 Claims, 5 Drawing Figures

METHOD AND APPARATUS ENABLING THERMAL ENERGY RECOVERY IN COMBUSTOR OPERATION

DESCRIPTION

TECHNICAL FIELD

The present invention concerns methods of operating combustors and combustor apparatus; the invention is particularly, but not exclusively, concerned with recovering at least part of the thermal energy normally lost when operating a fluidised bed combustor.

BACKGROUND ART

Fossil fuel combustors discharge flue-gases at elevated temperatures (the flue-gases from steam raising boiler plant for example, are normally discharged at a temperature somewhat above the temperature of the steam produced in the boiler) usually via a tall chimney to the atmosphere.

This method of operating produces an air draft which disperses noxious gases and alleviates acid condensate and its corrosive effects. The method does not however prevent atmospheric pollution; and the discharge of hot gases to the atmosphere means that there is a considerable thermal loss from the combustor with the result that the overall operating efficiency of the combustor is lower than would otherwise be the case.

DISCLOSURE OF INVENTION

One aspect of the present invention provides a method of operating a fluidised bed combustor including a bed of inert particulate material to which gas is fed to fluidise the bed and support combustion of fuels fed thereto, the method comprising scrubbing with water flue-gas passing from the combustor and subsequently transferring heat from the scrubbing water to the fluidising gas fed to the combustor.

A second aspect of the present invention provides a method of operating a boiler comprising the steps of scrubbing the flue-gas issuing from the boiler with water and using that water to pre-heat the working fluid fed to the boiler.

A third aspect of the present invention provides a fluidised bed combustor including means for passing fluidising gas to a bed of inert particulate material in the combustor, the combustor comprising scrubber means for scrubbing with water flue-gas passing from the combustor and heat transfer means for transferring heat from the water used to scrub the flue-gas to the fluidising gas fed to the bed in the combustor.

A fourth aspect of the present invention provides a boiler including scrubber means for scrubbing with water flue-gas passing from the boiler and thermal transfer means for transferring heat from the water used to scrub the flue-gas to the working fluid fed to the boiler.

BRIEF DESCRIPTION OF THE DRAWINGS

Embodiments of the present invention will now be described with reference to the accompanying drawings which show at.

BEST MODE OF CARRYING OUT THE INVENTION

Figure 1:
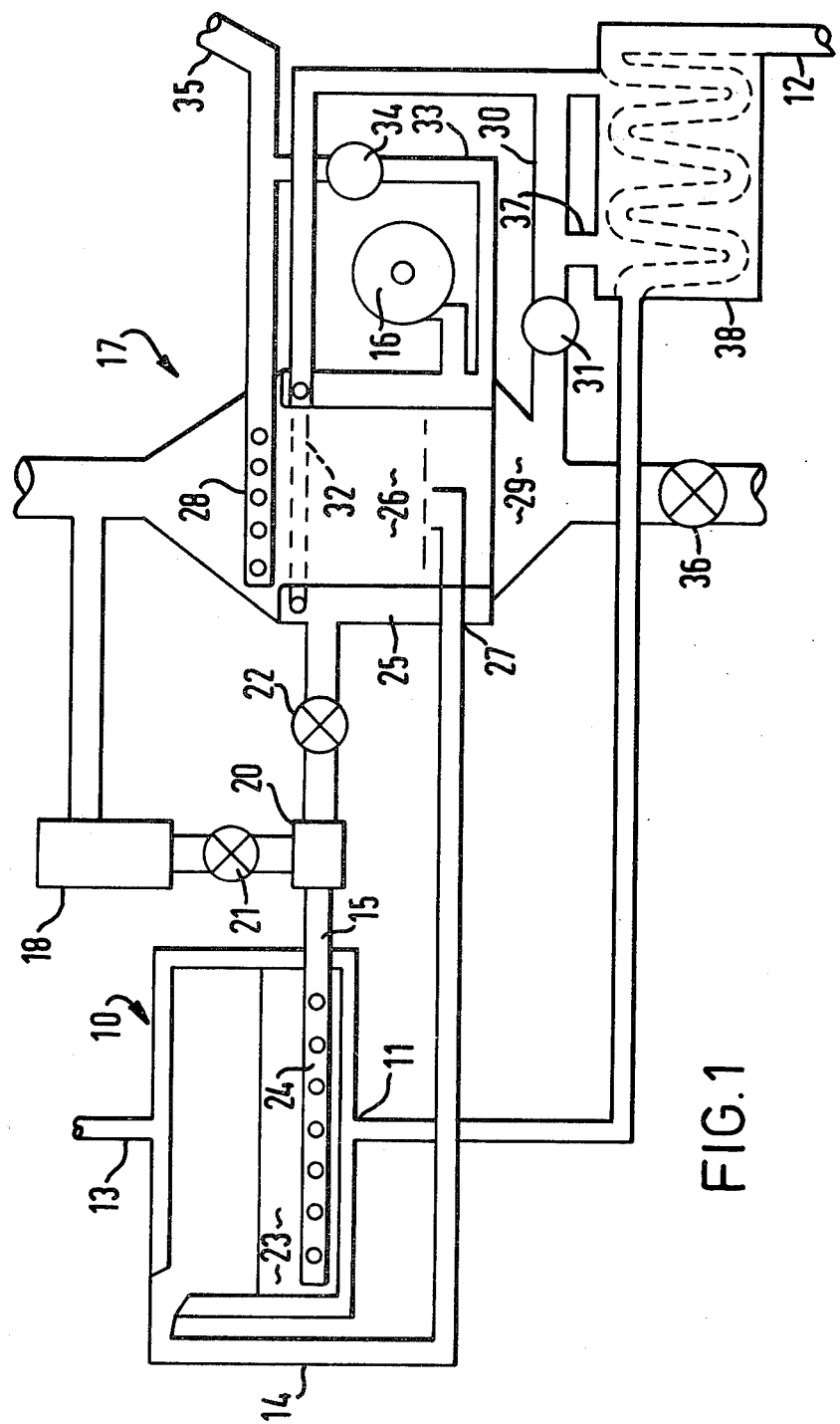
FIG. 1 a schematic outline of a fluidised bed boiler arrangement embodying the present invention, and at FIGS. 2, 3, 4 and 5 illustrate various modifications which may be made to the arrangement of FIG. 1

With reference to FIG. 1 which shows a fluidised bed shell type boiler 10 to an inlet 11 of which a working fluid, water, is fed from a source 12. Heater water, or steam, is taken from the boiler via an outlet 13. The boiler 10 shown in FIG. 1 is a shell boiler but it will be appreciated that any other kind of boiler may be used.

The gaseous products of combustion of the boiler pass therefrom via a flue 14. Gas to fluidise the bed in the boiler is fed to the boiler via an inlet 15. The fluidising gas comprising a mixture of ambient air sucked in by a fan 16 and recycled flue-gas taken from the end of a stack 17 connected to the outlet flue 14 of the boiler as shown. Flue-gas is extracted from the stack 17 by a recycle gas fan 18 as shown.

Mixture of recycled flue-gas and of fresh air fed to the boiler is effected in a plenum chamber 20; the ratio of air and/or flue-gas passed to plenum chamber 20 is controlled by operation of respective valves 21 and 22 as shown. The fluidising gas from the chamber 20 is fed to the material of the bed 23, in the boiler 10, via an array of sparge pipes 24 located within the bed material as shown.

Air from fan 16 is fed to plenum chamber 20 via an enclosed annular volume 25 surrounding a scrubber 26 in the base part of stack 17. Flue-gas from the outlet 14 of boiler 10 enters scrubber 26 via an inlet 27 and passes up, through scruber 26, to the upper part of stack 17. Whilst passing up scrubber 26 flue-gas from flue 14 meets a downwardly directed flow of water issuing from a sparge-element or elements 28 located immediately below the outlet of stack 17.

Water from the element or elements 28 passes down the scrubber 26 to collect in a sump 29. Water is withdrawn from sump 29, via a pipe 30 and pump 31, and passed to a generally circular sparge element 32 located in an upper part of annular volume 25. Water falls from element 32 down annular volume 25 and is extracted at the bottom of that volume, via a pipe 33 and pump 34, and passed to the sparge element or elements 28 as shown.

It will be appreciated that the water falling down scrubber 26 and annular volume 25 is passing effectively around a closed loop. As water falls down scrubber 26 it contacts the heated flue-gas moving upwardly and warms. The water so heated collects in sump 29 and is then passed via element 32 to the volume 25 in which it is intermixed with air passing therethrough. The water, heated by the flue-gas as it falls down scrubber 26, therefore gives up at least part of the heat it has collected to the air that is passing, through volume 25 on its way to the bed 23 in boiler 10. At the same time part of the water falling down the annular volume 25 may be entrained with the air passing therethrough and carried to plenum chamber 20. Additional "make-up" water may be provided to the closed loop at an inlet 35 as shown.

It will be seen that the apparatus described with reference to FIG. 1 provides that the flue-gas passing from the boiler is scrubbed before it leaves the stack 17 thereby reducing thermal and chemical pollution of the atmosphere, also it will be seen that the air from the inlet fan 16 is warmed by contact with the heated scrubbing water falling down annular volume 25 (and may in fact be charged with water vapour) prior to its being mixed with recycled flue-gas in the plenum chamber 20 and passed to the fluidised bed 23 in boiler 10.

As shown in FIG. 1 the sump 29 of stack 17 includes outlet means 36 enabling the sludge or slurry of dirt and other particles entrained by water falling down scrubber 26 to be removed from the sump. Additional means (not shown) may be provided to enable water to be added to the sludge or slurry in sump 29 both to reduce its acidity and to ease its removal from the sump.

Water collected from the sump 29 and passed to the sparge element 32 is used to pre-heat the working fluid passing from source 12 to the boiler inlet 11. As shown the pipe 30 connecting pump 31 with element 32 is provided with a branch 37 leading to a shell-and-tube heat exchanger 38. After passage through the heat exchanger 38 the water bled-off in branch 37 is remixed with the main flow of water from the pump 31. In the heat exchanger 38 water from sump 29 gives up at least part of the heat it carries to the water being passed to the inlet 11 of the boiler.

Apparatus embodying the present invention may also provide that the flue-gas passing from the boiler is (in addition to the cooling which takes place in the scrubber 26) separately cooled.

Figure 2:
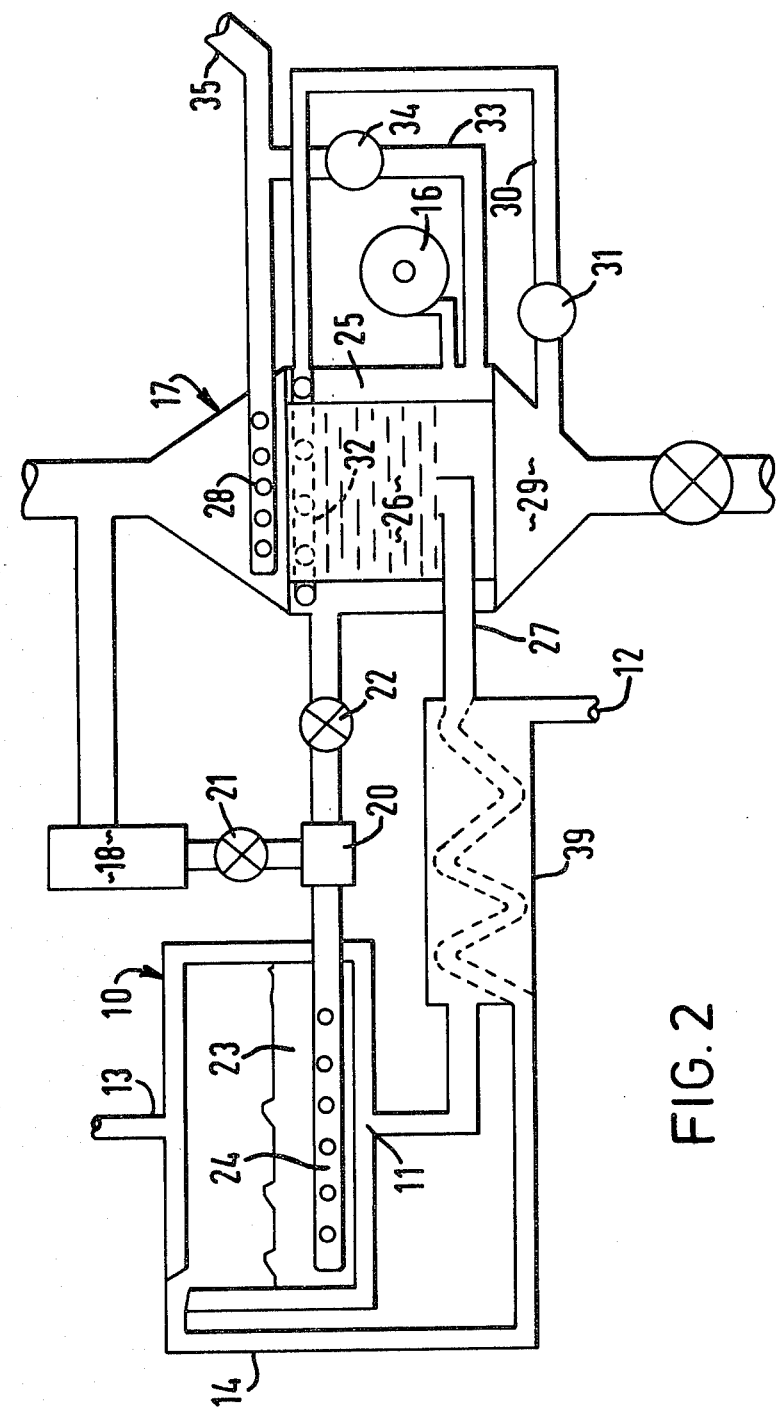

In the alternative arrangement of FIG. 2 flue-gas passing from the boiler 10 is passed through a heat exchanger 39 prior to being passed to the inlet 27 of the scrubber 26. In heat exchanger 39 heat from the flue-gas is given up to water passing from the source 12 to the inlet 11 of the boiler 10.

Figure 3:
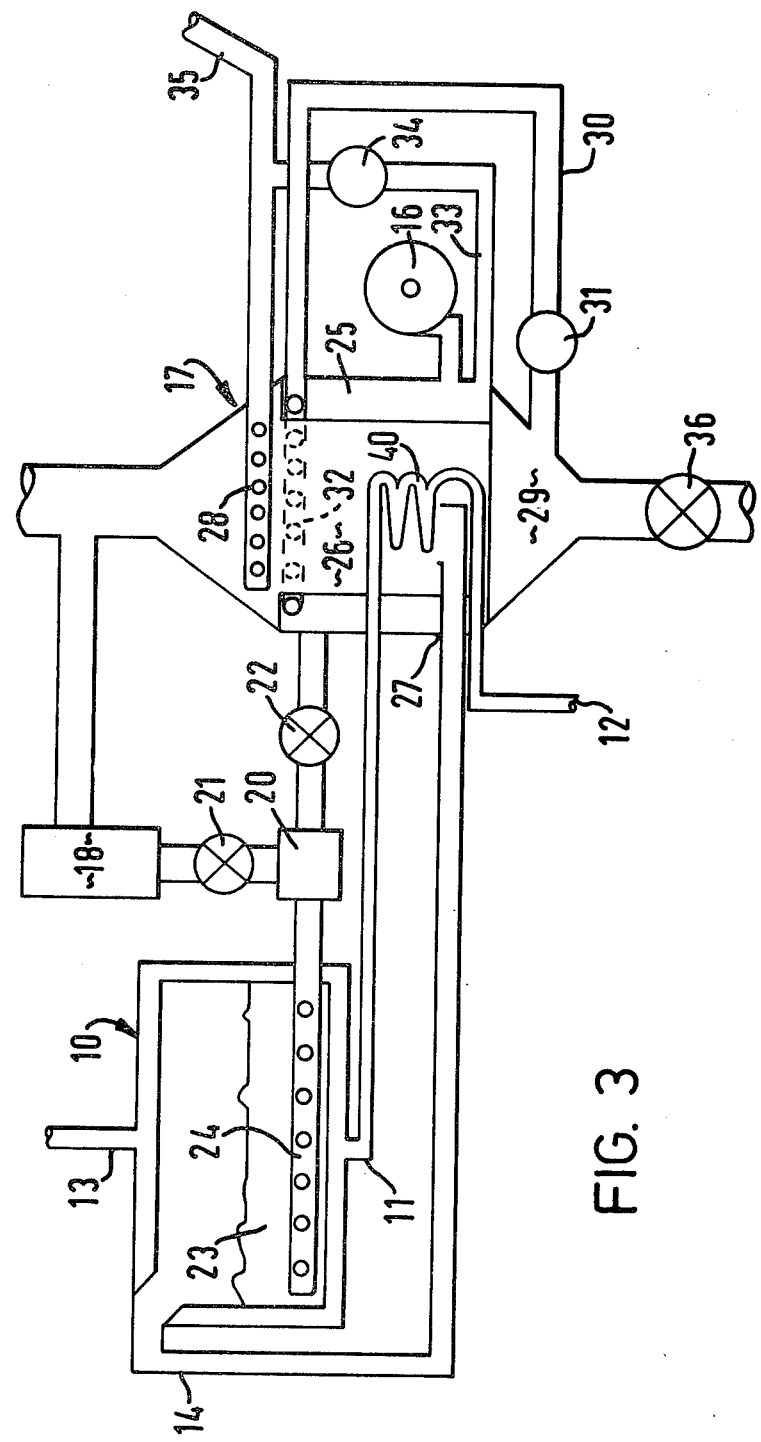

In a second alternative arrangement (see FIG. 3) a heat exchanger 40 is located within the scrubber 26 increasing the cooling of the flue-gas passing through scrubber 26 and enabling water passing from the source 12 to be pre-heated prior to its being fed to the boiler 10.

Figure 4:
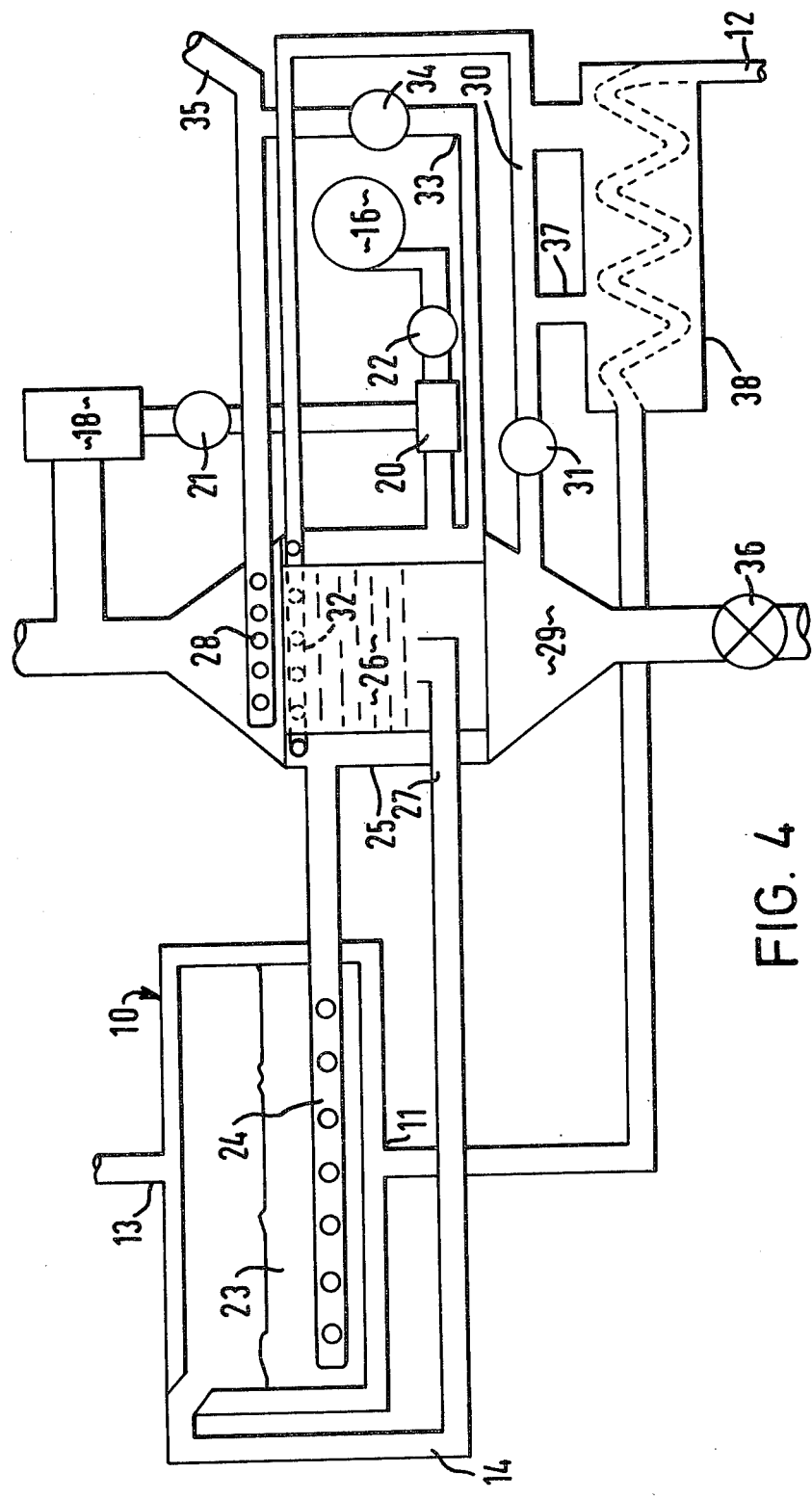

A further modification to the design shown in FIG. 1 is illustrated in FIG. 4 in which it will be seen that the recycled flue-gas is mixed with the air from the inlet fan 16 prior to passage of the fluidising gas through annular volume 25. Such an arrangement may be advantageous when it is particularly desired that the fluidising gas fed to the bed 23 in boiler 10 carry a high proportion of water vapour.

Figure 5:
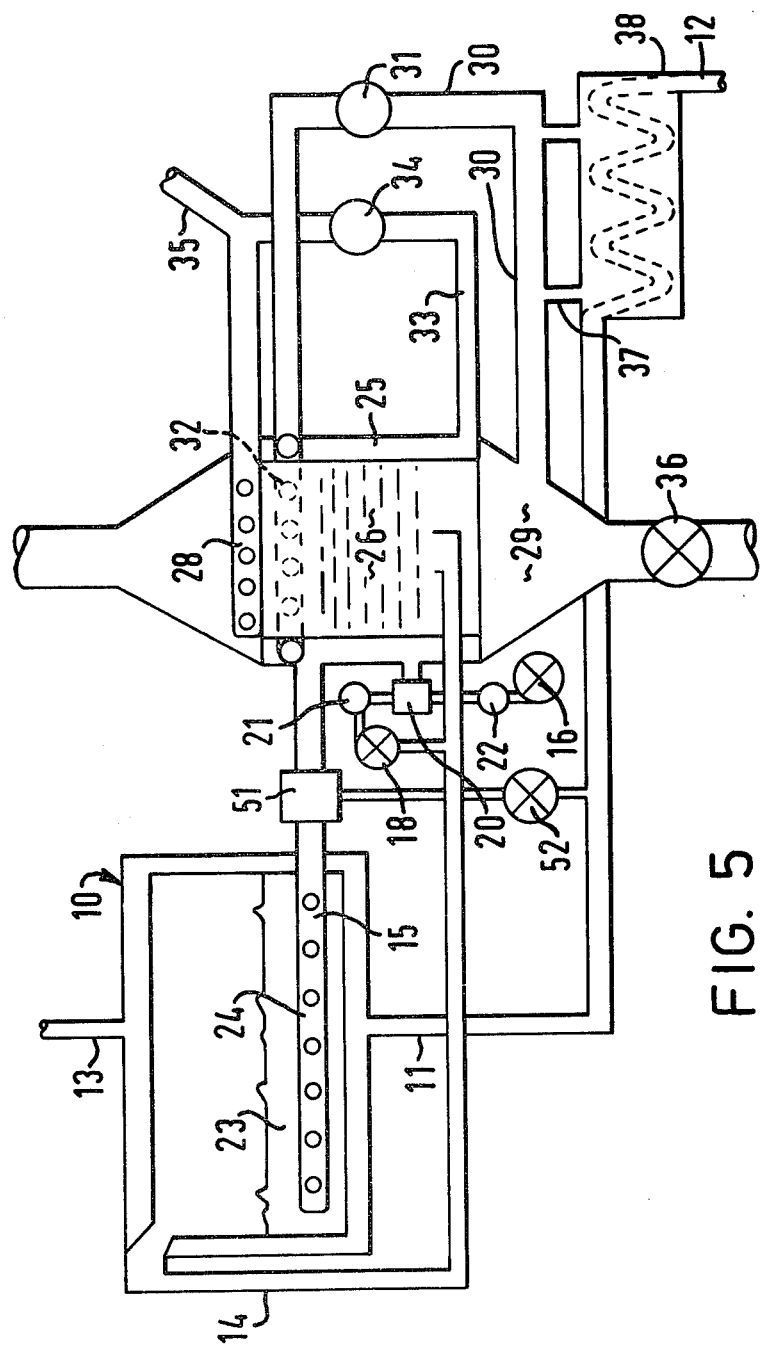

In the modified arrangement of FIG. 5 the recycling of flue-gas at a temperature in excess of 100° C. is enabled. This arrangement provides that the flue-gas is drawn off from the lower part of the stack via a conduit 50 and fan 18 (or even as shown in dotted outline from the flue 14 directly) prior to its being cooled by passage upwardly through the scrubber 26. Such an arrangement enables the mixture of gases fed to the boiler 10 to fluidise the bed 24 to carry steam (not being limited as when the fluidising gas temperature is below 100° C. to carrying vapour at 100% relative humidity). The proportion of steam carried by the mixture of fluidising gas in the arrangement of FIG. 5 may be augmented, for example by water injection as shown at 51 under the control of a valve 52 bleeding pre-heated water from the supply to inlet 11. The advantages of the arrangement of FIG. 5 are that the heat-transfer and bed cooling are improved by making use of the higher specific heat of steam, the water-gas reaction and some dissociation within the bed 23.

As described the flue-gas may be drawn from the flue 14, the scrubber 26 or a section of the scrubber where the temperature of it is in excess of 100° C. The flue-gas not so withdrawn may be exhausted to atmosphere after passage upwardly through the scrubber 26 (FIG. 1) either alone or in combination with a heat exchanger such as at 39 in FIG. 2 or 40 in FIG. 3.

It will be seen from all the described arrangements that the thermal transfer from the flue-gas to the scrubbing water, and the subsequent thermal transfer from that water to the fluidising/combustion air and/or recycled flue-gas fed to the fluidised bed in the combustor 10 gives many advantages over the known arrangements.

Particular advantages which arise are that the flue-gas is scrubbed prior to its being ejected from the chimney with a subsequent reduction in atmospheric pollution, and that the flue-gas is cooled as it passes through the scrubber 26 (and possibly separate heat exchangers 29 and/or 40) so that thermal pollution is reduced and at least part of the heat normally wasted by discharge of the flue-gas to the atmosphere is saved and returned to the boiler 10. Other advantages are that the gas fed to the fluidised bed 23 in the boiler 10 to aid combustion therein is charged with water vapour or steam enabling control of the boiler to be more readily effected than would otherwise be the case. It will be appreciated that the water or steam added to the gas passing to the fluidised bed of the boiler is at a higher temperature than the atmospheric gas passed to the boiler thereby reducing the thermal drop upon introduction of the gas to the boiler.

It is necessary, in the apparatus and a method of the present invention for there to be intimate thermal contact between the flue-gas and the water which is used to scrub it and this is best obtained, as described in the illustrated embodiments, by use of spray chambers or the like in which the water is passed to the scrubber chamber 26 by an array of sparge elements having relatively small apertures through which water can escape. Operation in this manner results in a scrubbing action as the water passes down the scrubbing tower 26 which percipitates dust and fly-ash carried away from the boiler 10 by the flue-gases. In addition this intimate thermal contact dissolves polluting constituents, for example sulphur dioxide, which are the combustion products of the sulphur particles within hydrocarbon fuels used in the boiler.

The descending water falling through scrubber 26 to the bottom of the stack 17 means that solids entrained with the water can settle as a sludge or slurry in the sump 29 and, as noted above, water may be added to this sump to ease removal of the sludge and reduce its acidity.

The water taken from the sump 29 is pumped to the sparge element 32 enabling the heat the water has gained in passing through the scrubber to be given up to the gas fed to the bed 23 and moisture to be carried to the bed 23. This increases the thermal transfer rate beyond that which could be achieved simply by heating the gas. In the arrangement of the present invention this is achieved by using relatively high air velocities for the air which passes through the volume 25.

When, as described in the present arrangements, the boiler includes a fluidised bed the high moisture content of the gas fed to the bed may improve the operating efficiency of the boiler in two particular respects, firstly the water carried with the combustion air improves in-bed cooling, and secondly the water may provide that a higher thermal output be obtained (by allowing the water carried by the gas to be turned into superheated steam at the temperatures in the bed and also due to the water-gas reaction and marginally by disassociation). The super-heated steam which is formed in the bed from the water carried in with the fludising gas passes through the boiler and, via the flue, re-enters scrubber 26 wherein it condenses. Condensation of steam in the scrubber should be made as complete as possible by reducing the gas velocities and increasing the contact times between the flue-gases and the water so that steam does not escape to the atmosphere although we have found that discharge of moisture at something approaching the saturation point is unavoidable.

Cooling of the fluidised bed 23 medium, which is usually an inert particular material such as sand, may be achieved by a number of different methods such as for example by recycling the flue-gas. When using this method and apparatus the effectiveness of the cooling is increased by cooling the flue-gas in the scrubber 26 (and in the heat exchanger 39 and/or 40).

An advantage found when using the apparatus and method of the present invention is that the reduced temperature of the recycled flue-gas which is abstracted to be re-passed to the boiler (due to its being cooled in scrubber 26) enables a reduction to be made in the fan size over that which would otherwise have to be used. That is to say the width and diameter of the recycle flue-gas fan 18 may be reduced and/or the speed of the fan may be reduced.

It is suggested that operation of the combustion apparatus including the described features improves the efficient use of valuable fuel and cuts thermal losses to something less than half of the values at present obtaining in comparable steam raising plant. The recuperative heat recovery by means of recycling water, which although described as being used with sparge pipes may be used with any other convenient element, also achieves precipitation of noxious compounds (thereby reducing atmospheric pollution); grit and dust (that may be carried away in the flue-gas) and removes the need for cyclone filters (necessary in certain arrangements presently available).

INDUSTRIAL APPLICABILITY

Although the above description is made with reference to a fluidised bed boiler it will be appreciated that the described principles may be applied to any form of combustor whether or not it includes a fluidised bed; it will further be seen that various modifications may be made to the described arrangements without departing from the scope of the present invention.

We claim:

1. A method of operating heating apparatus including a fluidised bed of inert particulate material to which gas is fed to fluidise the bed and support combustion of fuel fed thereto, the method comprising using a mixture of air and recycled flue gas the proportions of which may be varied to fluidise the bed of inert particulate material, scrubbing flue gas passing from the heating apparatus with water and bringing at least a part of the air fluidising the bed into contact with the scrubbing water to enable said fluidising gas to entrain and carry water vapour and/or steam to said fluidised bed to aid control of the temperature of the bed, said fluidising air being fed to the fluidised bed by passing at least a part thereof through a chamber to which the water used to scrub the flue-gas is also passed.

2. A method according to claim 1, in which additional water is injected into the flow of fluidising gas fed to the heating apparatus.

3. A method according to claim 1 wherein the water used to scrub the flue gas is passed through a heat exchanger in which it heats the working fluid fed to the boiler.

4. The method according to claim 1 wherein said heating apparatus is a combustor.

5. The method according to claim 1 wherein said heating apparatus is a boiler.

* * * * *